Oct. 22, 1963  E. F. PETERSON  3,107,889
VIBRATOR MOUNTING
Filed March 2, 1961
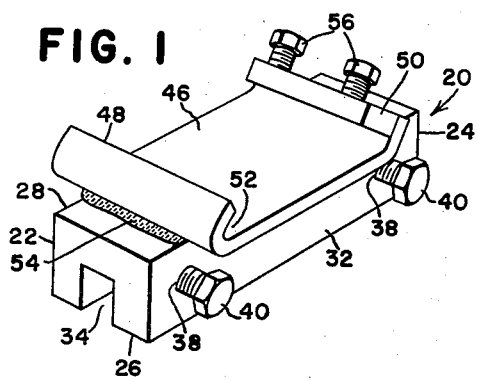
FIG. 1
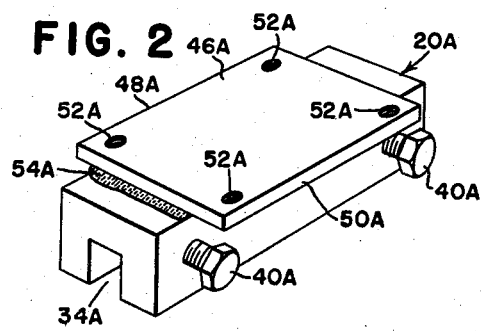
FIG. 2
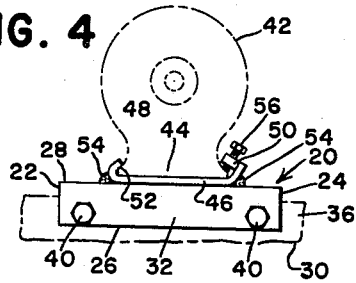
FIG. 4
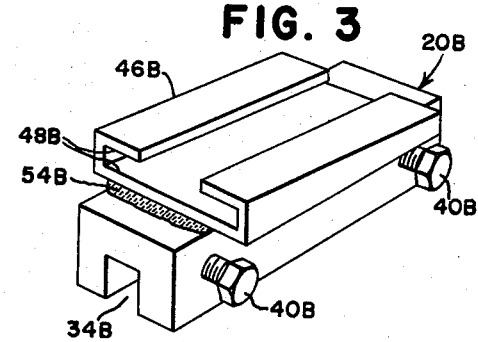
FIG. 3
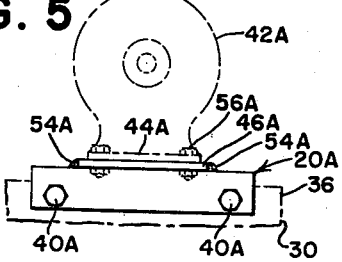
FIG. 5
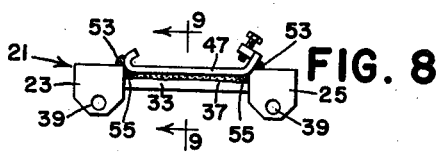
FIG. 8
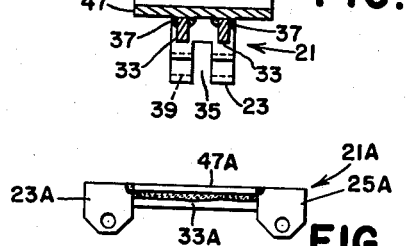
FIG. 9
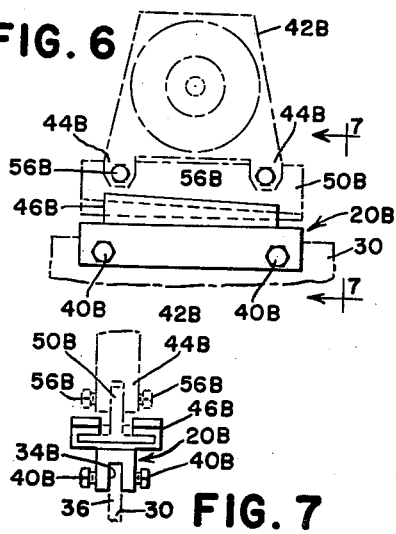
FIG. 6
FIG. 7
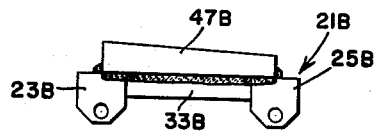
FIG. 10
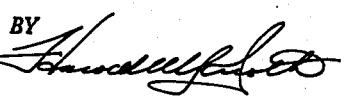
FIG. 11
INVENTOR.
E. F. PETERSON
BY
ATTORNEY

United States Patent Office 3,107,889
Patented Oct. 22, 1963

3,107,889
VIBRATOR MOUNTING
Edwin F. Peterson, % Martin Engr. Co., Neponset, Ill.
Filed Mar. 2, 1961, Ser. No. 92,842
3 Claims. (Cl. 248—14)

This invention relates to a vibrator mounting and more particularly to an improved mounting element for mounting a vibrator on various types of structures to be vibrated.

Those familiar with the art recognize that vibrators of various types are used to facilitate the handling of fluid, granular and other materials and that in the case of a portable vibrator, the unit is capable of being moved from structure to structure rather than providing each structure with its own vibrator. Consequently, it is desirable to provide a universally adaptable vibrator mounting and one which possesses other desirable characteristics such as low cost, long life and ease of handling.

The principal object of the present invention is to provide such improved mounting. More specifically, it is an object to provide the mounting in the form of an extremely rigid unitary backbone element which is of sufficient strength as to impart part of this strength to the vibrator itself, recognizing that substantially high forces are developed in situations of this character. A further specific object is to provide the vibrator mount in one form as a one-piece block-like element slotted from end to end to receive a rib or equivalent means on the structure to be vibrated. In another form, the element may be fabricated, having opposite end portions slotted as aforesaid and rigidified by rigidifying and strengthening means joined to and running lengthwise between the slotted end portions. Other objects reside in the provision of various types of means on the side of the element away from the slotted portion for mounting various types of vibrators.

The foregoing and other important objects and desirable features inherent in and encompassed by the invention will become apparent as preferred embodiments thereof are disclosed in the following detailed description and accompanying sheet of drawings, the several figures of which are described below.

FIGURE 1 is a perspective of one form of mounting element.

FIGURE 2 is a perspective of another form of element.

FIGURE 3 is a perspective of a third from of element.

FIGURE 4 is an elevation, on a reduced scale, showing an exemplary use of the element of FIGURE 1.

FIGURE 5 is a similar view showing an exemplary use of the element of FIGURE 2.

FIGURE 6 is a similar view showing an exemplary use of the element of FIGURE 3.

FIGURE 7 is an end view of FIGURE 6 on the line 7—7.

FIGURE 8 is an elevation, substantially on the scale of FIGURES 4, 5 and 6, showing a modified form of the element of FIGURE 1.

FIGURE 9 is a section taken on the line 9—9 of FIGURE 8.

FIGURE 10 is a view like FIGURE 8 but showing a modified form of the element of FIGURE 2.

FIGURE 11 is a view like FIGURES 8 and 10 and shows a modified form of the element of FIGURE 3.

The element of FIGURE 1 is designated in its entirety by the numeral 20 and in this case comprises an elongated substantially structurally strong one-place steel block-like element having opposite ends 22 and 24, a first side 26 facing toward the structure to be vibrated and a second side 28 facing away from such structure. This will be clear from FIGURE 4, wherein the structure is shown in broken lines and is identified generally by the numeral 30. Since the element 20 is here of one-piece construction, the portions thereof that extend between the opposite ends 24 and 26 are inherently part of the block-like element and therefore serve as rigidifying and strengthening means for the end portions. For purposes of general identification, the longitudinal rigidifying means is designated by the numeral 32.

The element at its first side 26 is longitudinally slotted at 34 and this slot is adapted to receive a rib 36 such as is commonly found on structures to be vibrated. In some cases, this rib will be specially provided for mounting the vibrator. In other cases, the rib may constitute a flange or other structural part of the structure. For the purpose of securely mounting the element 20 on the rib 36, the element is provided adjacent to its opposite ends with a pair of transverse threaded bores 38 on axes transverse to the length of the element. Each of these apertures is adapted to receive a threaded fastener in the form of a set screw 40. When the element is mounted on the rib 36, the set screws 40 are of course tightened to clamp the element in place. If desired, the opposite legs afforded respectively at opposite sides of the slot 34 may be apertured and two sets of set screws may be employed (FIGURE 7).

Some commercially known vibrators, an example of which is shown in FIGURE 4 and identified by the numeral 42, are of the type having a base 44 of a male dovetail nature. For the purpose of mounting vibrators of this type, the element 20 is provided with mounting means in the form of a plate-like member 46 having opposite ends 48 and 50 turned outwardly and directed toward each other at opposite angles so as to afford what may be regarded as a female dovetail socket 52. The member 46 is rigidly secured to the side 28 of the element 20, and it is preferable that the element and plate be joined by welding as at 54. In the case of the turned-up end 48, it may be an integral part of the plate 46. The end portion 50 may be a separate piece welded to the opposite end, this being preferred from the standpoint of enabling the provision in the piece 50 of a pair of tapped bores for receiving set screws 56 which, in ultimate installation, may be tightened down on the proximate portion of the vibrator base 44.

As noted, the element 20 is extremely strong and rigid and forms a substantial backbone between the structure 30 and the vibrator 42. Because of its extreme strength, it imparts part of this strength to the vibrator itself, affording a secure and rigid mount therefor, one that is capable of withstanding the substantial forces developed during operation of the vibrator.

As shown in FIGURES 2 and 5, the same principles may be carried out in a modified form. In these figures, the element itself is designated by the numeral 20A and, to the extent that it has characteristics similar to that shown in FIGURES 1 and 4, similar reference characters will be employed, with suffix "A," but only in a few brief instances. Hence, the slot is designated at 34A and the set screws at 40A. In place of the plate-like element 46, the structure of FIGURES 2 and 5 includes a flat plate 46A welded at 54A to the element 20A and having a transverse dimension greater than that of the element 20A so that opposite portions 48A and 50A overhang opposite sides of the element. These portions are apertured at 52A, the apertures being in the form of tapped bores for the purpose of receiving set screws. In cases in which the apertures are not tapped, bolts, such as shown in FIGURE 5 at 56A may be employed for mounting a vibrator 42A which has a flat base 44A. The structure 30 and its rib 36 are designated as before.

A third form of element 20B is shown in FIGURES 3 and 6 and here again reference characters will be only briefly applied in view of the similarity among the three elements 20, 20A and 20B. For example, the element 20B has the slot 34B and set screws 40B by means of which the element may be mounted on the rib 36 of the structure 30. In this case, the means for mounting the vibrator comprises a female socket member 46B welded to the element 20B at 54B and provided with interiorly tapering walls 48B to enable receipt of a male wedge member 50B (FIGURE 6) which may be driven in place. Although not shown here, any form of means may be employed for locking the male wedge 50B in the female wedge socket 46B. The vibrator shown in FIGURE 6 at 42B is of the type in which its base is provided with a pair of slotted lugs or ears 44B respectively having set screws 56B for clampingly engaging the rib of the male wedge 50B. Here again, the fundamental characteristics described above in connection with the element 20 are present and need not be elaborated.

In FIGURES 8 and 9 there is shown a modified form of the element 20, which will here be designated in its entirety by the numeral 21. This structure is substantially identical to that shown in FIGURE 1 except that the element 21 is made up of separate pieces welded together as at 53 and 55. Thus, the element as constituted has opposite ends 23 and 25, apertured at 39 for receiving set screws such as those shown at 40 in FIGURE 1. The intermediate portion of the element, as at 33, comprises a pair of relatively rigid bars extending between the end portions 23 and 25 and rigidly secured thereto as by welding at 37. This weldment is or may be a continuation of the weldment at 55 and serves also to mount a plate-like member 47 which, without further elaboration, will be seen to duplicate that shown at 46 in FIGURE 1. In other respects, the element has the same characteristics as the element 20 in the sense that it is extremely strong and rigid and affords the benefits available from the element 20. The mounting thereof on the structure 30 and the supporting of a vibrator such as at 42 will be obvious from FIGURE 4.

The element shown in FIGURE 10 is identified by the numeral 21A and has the same structural characteristics as that shown in FIGURE 8, with the exception that it mounts a plate 47A which is a duplicate of that shown in FIGURE 2. Since the structures are otherwise identical, further description is deemed to be unnecessary.

This applies also to the element 21B in FIGURE 11, which employs a female wedge member 47B similar to that shown in FIGURE 3. Otherwise, it follows the assembly pattern shown in FIGURES 6 and 7. That is to say, the elements 21A and 21B of FIGURES 10 and 11 respectively are made up of several parts, the element 21A having the ends 23A and 25A rigidly joined to the intervening portions 33A. In FIGURE 11, the ends 23B and 25B are rigidly joined by the intervening portions 33B. The end portions 23—25 etc. in each case are of course slotted to provide the equivalent of the slot 34 in the element 20, as will be apparent at 35 in FIGURE 9.

Features and advantages other than those enumerated herein will readily occur to those versed in the art, as will many modifications and alterations in the preferred embodiments shown, all of which may be achieved without departure from the spirit and scope of the invention.

What is claimed is:

1. In combination with a clamp and mounting unit for a vibrator, a structure with an elongated relatively narrow rib on which the clamp is mounted, a vibrator supported on the mounting unit and having an axis of rotation primarily in a plane perpendicular to the plane of the rib, said structure comprising an elongated relatively narrow and extremely rigid backbone element lying with its length parallel to the rib and having opposite end portions, said element further having a first longitudinal part facing the rib and a second longitudinal part facing away from the rib, said end portions respectively having relatively narrow longitudinally directed and alined slots therein at said first part and in the plane of and opening toward and receiving of the rib to provide at each end portion a pair of closely spaced apart opposed walls astride the rib, the pair of walls at one end portion being spaced a substantial longitudinal distance from the pair of walls at the other end portion so as to increase the stability between said unit and the rib, each pair of walls having coaxial threaded through bores respectively therein on an axis perpendicular to the aforesaid plane, and said element further including rigidifying means running lengthwise thereof between and rigidly joined to said end portions at said first part to unify said walls with said first and second parts; threaded fasteners received respectively in said bores and projecting inwardly through the respective walls in direct clamping engagement with the rib at opposite faces thereof so as to clamp said element rigidly but removably to the rib; and means substantially coextensive in length with said rigidifying means and overlying and rigid with the element at said second part for rigidly but removably mounting the vibrator.

2. The invention defined in claim 1, in which: said last-named means comprises a plate-like member wider than the element and providing overhanging portions having apertures therein for receiving additional fasteners mounting the vibrator.

3. The invention defined in claim 1, in which said element is a one-piece block-like element slotted from end to end and said rigidifying means is an integral part of said one-piece element.

References Cited in the file of this patent

UNITED STATES PATENTS

| | | |
|---|---|---|
| 1,389,424 | De Brun | Aug. 30, 1921 |
| 1,416,201 | Haynes | May 16, 1922 |
| 1,609,446 | Tormey | Dec. 7, 1926 |
| 2,162,400 | Heath | June 13, 1939 |

FOREIGN PATENTS

| | | |
|---|---|---|
| 166,002 | Austria | May 25, 1950 |